(12) United States Patent
Fukuda

(10) Patent No.: US 6,477,365 B2
(45) Date of Patent: Nov. 5, 2002

(54) PORTABLE TELEPHONE COMMUNICATION SYSTEM AND PORTABLE TELEPHONE COMMUNICATION METHOD

(75) Inventor: Fumiyo Fukuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 126 days.

(21) Appl. No.: 09/779,614

(22) Filed: Feb. 9, 2001

(65) Prior Publication Data

US 2001/0004590 A1 Jun. 21, 2001

Related U.S. Application Data

(63) Continuation of application No. PCT/JP99/04026, filed on Jul. 27, 1999.

(51) Int. Cl.⁷ .............................. H04M 3/42; H04Q 7/20
(52) U.S. Cl. ...................... 455/415; 455/414; 455/466; 379/201.01; 379/201.02
(58) Field of Search ......................... 455/414, 415–418, 455/422, 435, 458, 466, 507, 515, 517, 560, 432, 433, 461; 379/201.01, 201.02, 201.03, 201.07, 201.08

(56) References Cited

U.S. PATENT DOCUMENTS 5,548,636 A * 8/1996 Bannister et al. ...... 379/390.01
5,590,184 A * 12/1996 London ................. 379/142.09
5,883,943 A * 3/1999 Siddiqui ................ 379/142.02
6,115,461 A * 9/2000 Baiyor et al. .......... 379/211.02
6,404,858 B1 * 6/2002 Farris et al. ........... 379/201.02

* cited by examiner

Primary Examiner—Lee Nguyen
Assistant Examiner—Simon Nguyen
(74) Attorney, Agent, or Firm—Rothwell, Figg, Ernst & Manbeck

(57) ABSTRACT

A portable telephone communication system has a plurality of mobile stations existing in a control zone which denotes a service area, a radio base station for communicating with the mobile stations, and a network managing apparatus for managing a network of the control zone. According to a request of a first mobile station of the mobile stations, the network managing apparatus registers voice data to be added to a call-in control signal which is to be transmitted to a second mobile station of the mobile stations, receives a call-out control signal transmitted from the first mobile station through the radio base station, adds-the registered voice data to the call-in control signal which is to be transmitted to the second mobile station, and transmits the call-in control signal to the second mobile station. The second mobile station outputs the voice data, which is added to the call-in control signal, before an answer to a call of-the first mobile station. Therefore, a user of the call-in side can reliably recognize the caller or can recognize a degree of importance of the call according to the voice before an answer to the call.

10 Claims, 6 Drawing Sheets

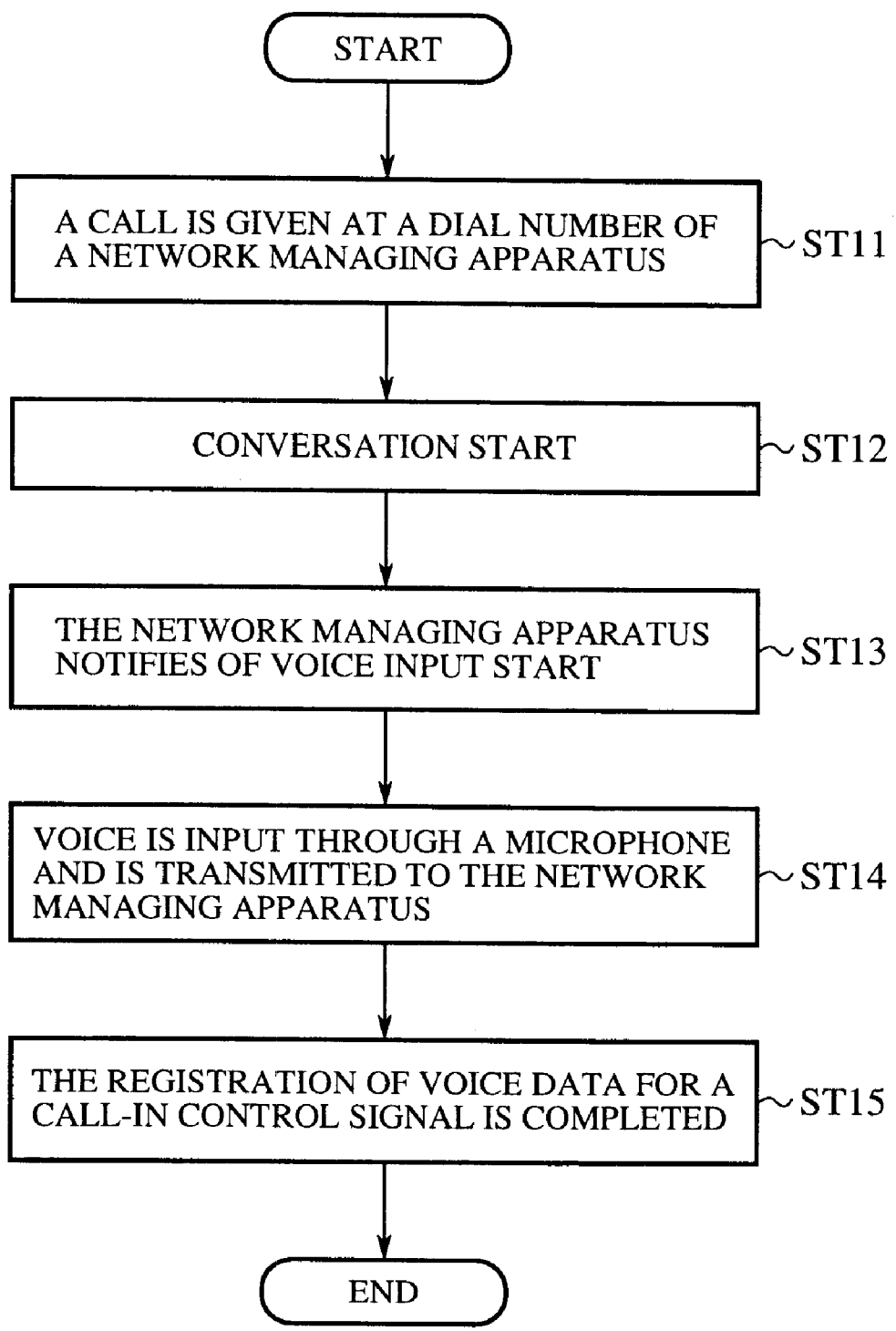

PORTABLE TELEPHONE COMMUNICATION SYSTEM AND PORTABLE TELEPHONE COMMUNICATION METHOD

CROSS-REFERENCE TO The RELATED APPLICATION

This application is a continuation of International Application No. PCT/JP99/04026, whose International filing date is Jul. 27, 1999, the disclosures of which Application are incorporated by reference herein. The present application has not been published in English.

BACKGROUND OF THE INVENTION

1. Field of the Invention

The present invention relates to a portable telephone communication system and a portable telephone communication method in which additional information relating to a caller or call contents is notified to a user before an answer to a call in a telephone communication network which is, in particular, a cellular type portable telephone network.

2. Description of Related Art

FIG. 1 is a block diagram showing a schematic configuration of a conventional portable telephone communication system. In FIG. 1, 1 indicates each of a plurality of radio base stations arranged in a control zone 2 which denotes a service area. 3 indicates each of a plurality of mobile stations which move in the control zone 2 and respectively communicate with one radio base station 1.

Also, in FIG. 1, 101 indicates a call-in control signal transmitted from one radio base station 1 to one mobile station 3. The call-in control signal 101 is,. for example, based on recommendations of a Global System for Mobile Communications (GSM). 102 indicates a reception completion notifying signal transmitted from one mobile station 3 to one radio base station 1.

Next, an operation is described.

In a portable telephone network, a plurality of radio base stations 1 are arranged in the control zone 2 denoting a service area, and the reception of the call-in control signal 101 transmitted from one radio base station 1 and the transmission of the reception completion notifying signal 102 to the radio base station 1 are performed in each mobile station 3.

In cases where the communication is performed in each mobile station 3, a call-in control signal 101 transmitted from one radio base station 1 is received in the mobile station 3, and a mobile station identification number existing in the call-in control signal. 101 is recognized. In cases where the recognized mobile station identification number agrees with a mobile station identification number held in the mobile station 3, the mobile station 3 responds to the call-in control signal 101, and a reception completion notifying signal 102 is transmitted from the mobile station 3 to the radio base station 1. In contrast, in case of non-agreement, the mobile station 3 ignores the received call-in control signal 101.

In cases where the call-in control signal 101 agreeing with the mobile station identification number of the mobile station 3 is received in the mobile station 3, a call sound is generated to notify a user.

Because the conventional portable telephone communication system has the above-described configuration, there is a problem that a caller cannot be specified when a call-in control signal 101 is received in the mobile station 3. Also, in cases where it is considered in the mobile station 3 whether or not the user of the mobile station 3 should perform an answer in response to the received call-in control signal 101, there is another problem that a degree of importance of the call cannot be judged in the mobile station 3.

As a technique for solving the above problems, there is a telephone terminal apparatus disclosed in the Published Unexamined Japanese Patent Application H9-153955 (1997). In this telephone terminal apparatus, a fixed message is stored in a memory, this fixed message is transmitted in a call operation, and the sent fixed message is notified to a user of a call-in side before the user performs a telephone conversation as an answer to the call. However, there is a problem that the memory, in which the fixed message is stored, is required in the telephone terminal apparatus.

SUMMARY OF THE INVENTION

The present invention is provided to solve the above problems, and an object of the present invention is to provide a portable telephone communication system and a portable telephone communication method in which a caller can be specified and a degree of importance of a call can be judged, without storing information relating to the specification of the caller and/or the degree of importance of the call in a mobile station 3 of a call-out side, when a call-in control signal 101 is received in a mobile station 3 of a call-in side.

A portable telephone communication system according to the present invention comprises a plurality of mobile stations existing in a control zone which denotes a service area, a radio base station for communicating with the mobile stations, and a network managing apparatus for managing a network of the control zone. In the portable telephone communication system, the network managing apparatus registers, according to a request of a first is mobile station of the mobile stations, additional information to be added to a call-in control signal which is to be transmitted to a second mobile station of the mobile stations, the network managing apparatus receives a call-out control signal transmitted from the first mobile station through the radio base station, the network managing apparatus adds the registered additional information to the call-in control signal which is to be transmitted to the second mobile station, the network managing apparatus transmits the call-in control signal to the second mobile station, and the second mobile station outputs the additional information, which is added to the call-in control signal, before an answer to a call of the first mobile station.

Therefore, a user of the second mobile station can acknowledge the additional information transmitted from a user of the first mobile station before an answer to a call of the first mobile station.

In a portable telephone communication system according to the present invention, the additional information registered in the network managing apparatus is information specifying a user of the first mobile station.

Therefore, a user of the second mobile station can acknowledge a user of the first mobile station before an answer to a call of the first mobile station.

In a portable telephone communication system according to the present invention, the additional information registered in the network managing apparatus is information indicating a degree of importance of the call of the first mobile station.

Therefore, a user of the second mobile station can acknowledge a degree of importance of a call of the first mobile station before an answer to the call of the first mobile station.

In a portable telephone communication system according to the present invention, the network managing apparatus registers voice data as the additional information.

Therefore, a user of the second mobile station can acknowledge the additional information transmitted from a user of the first mobile station in a voice.

In a portable telephone communication system according to the present invention, the network managing apparatus registers text data as the additional information.

Therefore, a user of the second mobile station can acknowledge the additional information transmitted from a user of the first mobile-station in a text form.

In a portable telephone communication system according to the present invention, the first mobile station transmits the text data according to a short message service (SMS) of a Global System for Mobile Communications (GSM) to register the text data in the network managing apparatus.

Therefore, a user of the second mobile station can acknowledge the additional information transmitted from a user of the first mobile station in a text form according to a communication type of the GSM.

In a portable telephone communication system according to the present invention, the second mobile station sets whether or not the additional information added to the call-in control signal is to be output, the second mobile station rings a call-in sound and outputs the additional information when the call-in control signal, to which the additional information is added, is received in the second mobile station in cases where the second mobile station sets so as to output the additional information.

Therefore, a user of the second mobile station can select the outputting of the transmitted additional information or the non-outputting of the transmitted additional information according to conditions of the user.

In a portable telephone communication system according to the present invention, the network managing apparatus comprises an additional information storing unit for registering the additional information, and a network control unit for adding the additional information registered in the additional information storing unit to the call-in control signal to be transmitted to the second mobile station.

Therefore, the additional information can be registered in the network managing apparatus, and it is not required to store the additional information in the first mobile station.

A portable telephone communication system according to the present invention comprises a plurality of mobile stations existing in a control zone which denotes a service area, a radio base station for communicating with the mobile stations, and a network managing apparatus for managing a network of the control zone. In the portable telephone communication system, the network managing apparatus registers a plurality of types of additional information respectively to be added to the call-in control signal, which is to be transmitted to the second mobile station, and a plurality of numbers corresponding to the plurality of types of additional information, the plurality of types of additional information and the corresponding numbers are transmitted to the first mobile station, the first mobile station selects a prescribed type of additional information from the plurality of types of transmitted additional information, the first mobile station adds a number corresponding to the prescribed type of additional information to the call-out control information, the first mobile station transmits the call-out control information to the network managing apparatus through the radio base station, the network managing apparatus adds the prescribed type of registered additional information corresponding to the number, which is added to the call-out control information, to the call-in control signal to be transmitted to the second mobile station, the network managing apparatus transmits the call-in control signal to the second mobile station through the radio base station, and the second mobile station outputs the additional information, which is added to the call-in control signal, before an answer to a call of the first mobile station.

Therefore, the first mobile station can appropriately select a type of additional information in response to each call given to the second mobile station.

In a portable telephone communication method according to the present invention, a communication is performed while having a plurality of mobile stations existing in a control zone which denotes a service area, a radio base station for communicating with the mobile stations, and a network managing apparatus for managing a network of the control zone. The portable telephone communication method comprises the steps of registering, according to a request of a first mobile station of the mobile stations, additional information to be added to a call-in control signal, which is to be transmitted to a second mobile station of the mobile stations, in the network managing apparatus, receiving a call-out control signal, which is transmitted from the first mobile station through the radio base station, in the network managing apparatus, adding the registered additional information to the call-in control signal, which is to be transmitted to the second mobile station, in the network managing apparatus, transmitting the call-in control signal from the network managing apparatus to the second mobile station, and outputting the additional information, which is added to the call-in control signal, from the second mobile station before an answer to a call of the first mobile station.

Therefore, a user of the second mobile station can acknowledge the additional information transmitted from a user of the first mobile station before an answer to a call of the first mobile station.

BRIEF DESCRIPTION OF THE DRAWINGS

FIG. 3 is a flow chart showing a procedure for registering voice data according to the first embodiment of the present invention;

DETAILED DESCRIPTION OF THE PREFERRED EMBODIMENTS

The invention will now be described with reference to the accompanying drawings.

Embodiment 1

Figures 1, 4:
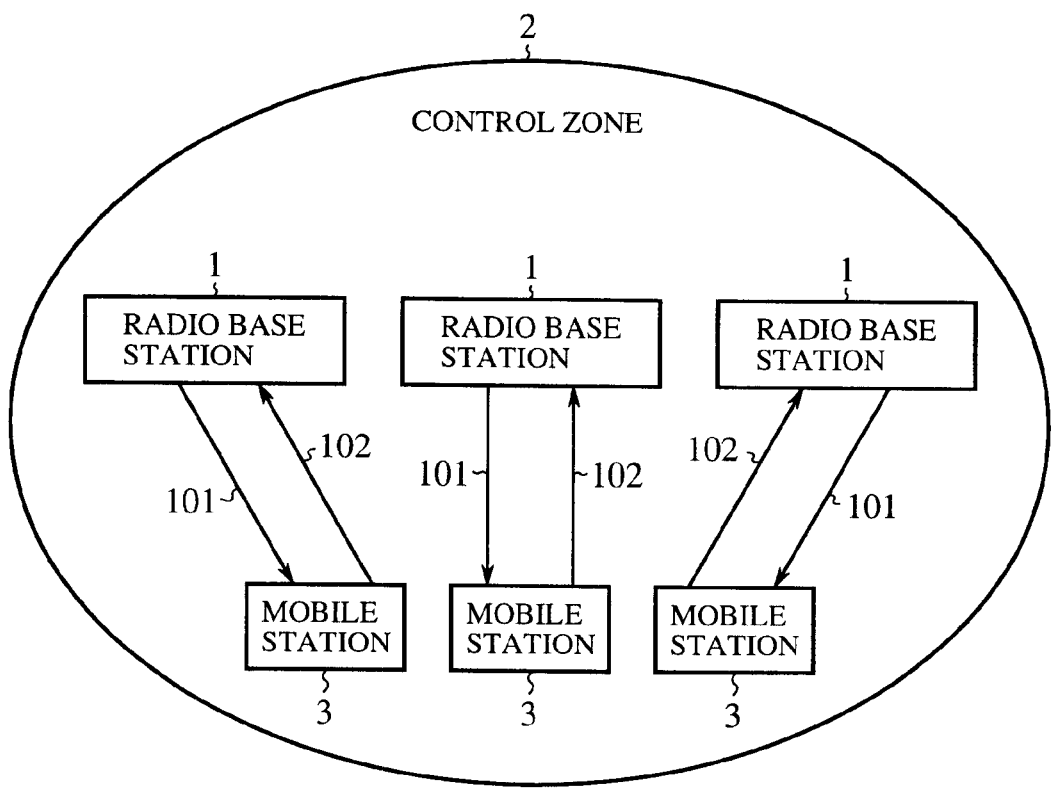
FIG. 1 is a block diagram showing a schematic configuration of a conventional portable telephone communication system.
FIG. 4 is a diagram showing an extended call-in control signal according to the first embodiment of the present invention.
Figure 2:
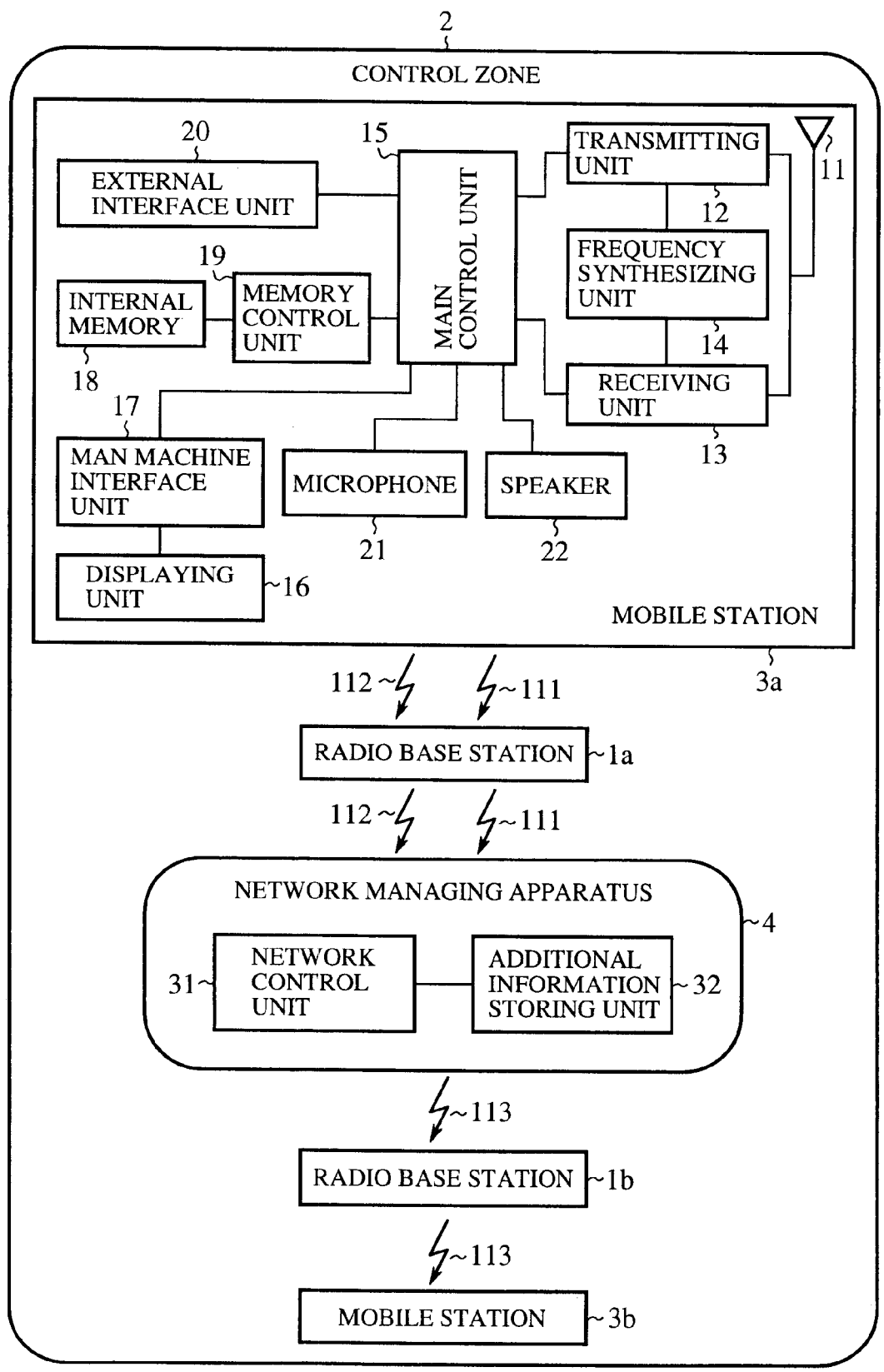
FIG. 2 is a block diagram showing the configuration of a portable telephone communication system according to a first embodiment of the present invention.

FIG. 2 is a block diagram showing the configuration of a portable telephone communication system according to a first embodiment of the present invention. In FIG. 2, 1a and 1b respectively indicate a radio base station arranged in a control zone 2 which denotes a service area. 3a indicates a mobile station (or a first mobile station), which moves in the control zone 2, for performing the sending and reception of communication data with the radio base station 1a. 3b indicates a mobile station (or a second mobile station), which moves in the control zone 2, for performing the sending and reception of communication data with the radio base station 1b. 4 indicates a network managing apparatus for managing a network of the control zone 2.

Also, in the mobile station 3a shown in FIG. 2?, 11 indicates an antenna. 12 indicates a transmitting unit for transmitting various signals to the radio base station 1a through the antenna 11. 13 indicates a receiving unit, for receiving various signals from the radio base station 1a through the antenna 11. 14 indicates a frequency synthesizing unit arranged between the transmitting unit 12 and the receiving unit 13. 15 indicates a main control unit for controlling all operations of the mobile station 3a. 16 indicates a displaying unit for displaying various types of information. 17 indicates a man machine interface unit for transmitting the various types of information to the displaying unit 16 under control of the main control unit 15. 18 indicates an internal memory for temporarily storing various types of information set by a user and transmitted voice data. 19 indicates a memory control unit for controlling the internal memory 18. 20 indicates an external interface unit for performing a connection of a serial interface or the like. 21 indicates a microphone. 22 indicates a speaker. The mobile station 3b has the same configuration as that of the mobile station 3a.

In addition, in the network managing apparatus 4 shown in FIG. 2, 31 indicates a network managing apparatus for controlling the whole network managing apparatus 4. 32 indicates an additional information storing unit for storing additional information such as voice data or text data to be added to a call-in control signal which is transmitted to the mobile station 3a or 3b. 111 indicates a call-out control signal output from the mobile station 3a. 112 indicates a registration signal used when the mobile station 3a registers the additional information to the network managing apparatus 4. 113 indicates an extended call-in control signal to which the additional information registered in the network managing apparatus 4 is added.

Next, an operation is described.

FIG. 3 is a flow chart showing a procedure for registering voice data as additional information according to the first embodiment of the present invention. In this embodiment, the mobile station 3a is placed on the call-out side, and the mobile station 3b is placed on the call-in side. Here, because the correspondence between a user's key operation and a function obtained by the key operation can be arbitrarily prescribed, the description of the user's key operation is omitted.

In a step ST11, a call-out control signal 111 is transmitted from the mobile station 3a through the radio base station 1a at a dial number pre-set in the network managing apparatus 4 under control of the main control unit 15 of the mobile station 3a. In a step ST12, a telephone conversation is started by using an automatic voice or by an operator in the network managing apparatus 4 in which the call-out control signal 111 is received. In a step ST13, the network managing apparatus 4 notifies the mobile station 3a in a voice that the transmission of voice data to be registered in the network managing apparatus 4 is allowed.

In a step ST14, a user's name, a name of a company, to which the user belongs, or information, which indicates a degree of importance of a call and is specified on the call-out side, is, for example, received as voice data from the user of the call-out side through the microphone 21 and is taken in the main control unit 15 of the mobile station 3a. Thereafter, the voice data is transmitted to the network managing apparatus 4 through the radio base station 1a as a registration signal 112.

In a step ST15, the transmitted voice data is coded in the network control unit 31 of the network managing apparatus 4 and is registered in the additional information storing unit 32 under control of the network control unit 31.

Next, a case where the user, who registers the voice data in the network managing apparatus 4 as additional information, give a phone call to a third person is described.

FIG. 4 is a diagram showing contents of an extended call-in control signal 113 transmitted from the network managing apparatus 4 to the mobile station 3b. In FIG. 4, 51 indicates a type identifying unit for identifying a type of a call-in control signal. 52 indicates a caller number information such as a telephone number of a caller. The type identifying unit 51 and the caller number information 52 are indicated in the GSM recommendations as a calling control signal. 53 indicates additional information such as voice data or text data which is newly added to a conventional call-in control signal. The additional information is, for example, a user's name, a name of a company, to which the user belongs, or information which indicates a degree of importance of a call and is specified on the call-out side.

In cases where a user of the mobile station 3a gives a phone call to a user of the mobile station 3b, the user of the mobile station 3a transmits a call-out control signal 111 to the network managing apparatus 4 through the radio base station 1a. In the network control unit 31 in which the call-out control signal 111 is received, the voice data registered in the additional information storing unit 32 is read out, and the coded voice data is added to a call-in control signal. The coded voice data is, for example, a user's name, a name of a company, to which the user belongs, or information which indicates a degree of importance of a call and is specified on the call-out side. Thereafter, the call-in control signal including the coded voice data is transmitted to the mobile station 3b through the radio base station 1b as an extended call-in control signal 113.

Also, in cases where a user of the mobile station 3a gives a phone call to a user of the mobile station 3b without adding registered voice data to a call-in control signal, the user of the mobile station 3a sets specification information, which indicates the non-addition of registered voice data, in a call-out control signal 111, and the call-out control signal 111 including the specification information is transmitted to the network managing apparatus 4. In the network managing apparatus 4, no additional information is added to a call-in control signal, and the call-in control signal is transmitted to the mobile station 3b.

Figure 5:
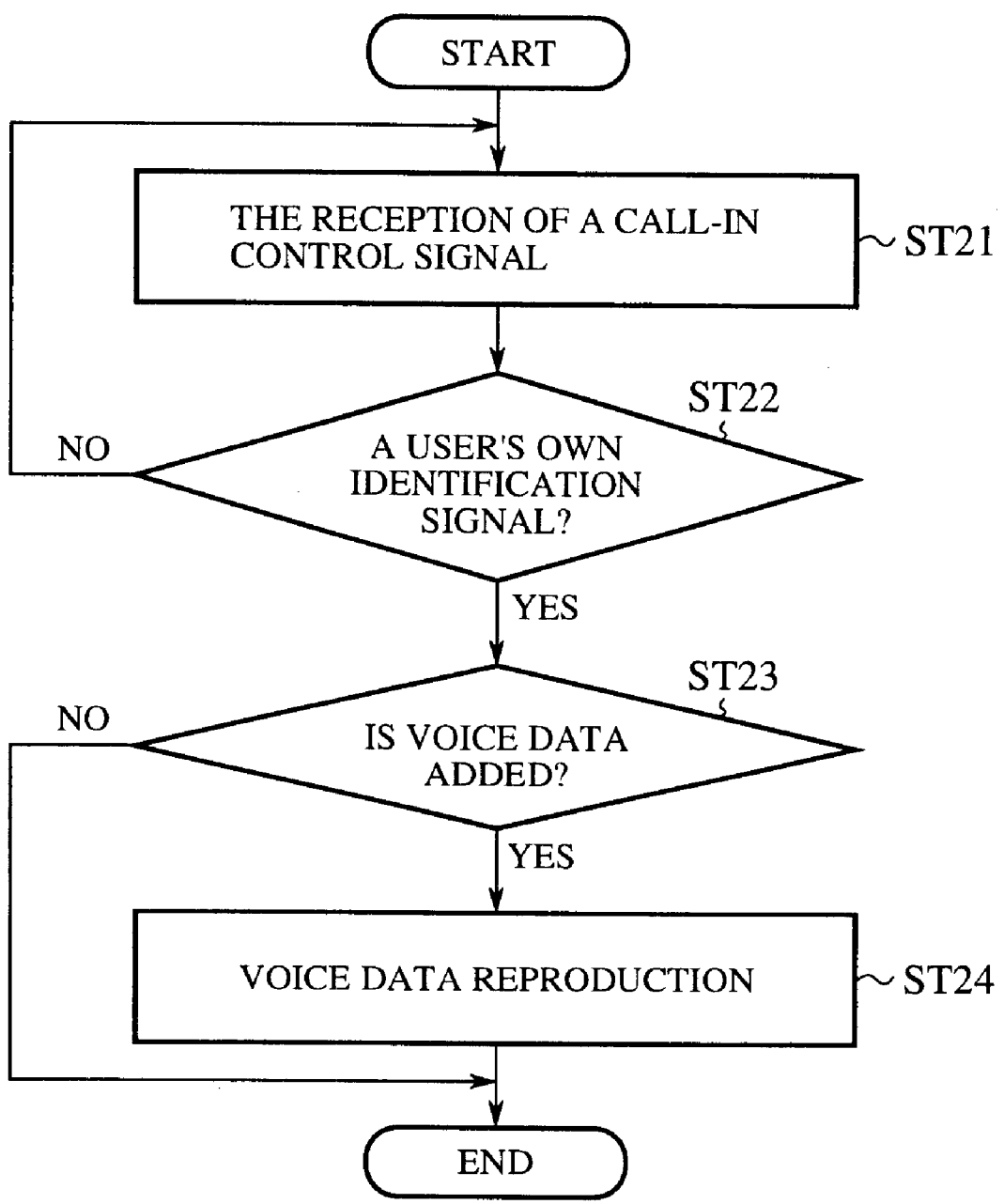
FIG. 5 is a flow chart showing a procedure for receiving the extended call-in control signal and reproducing the voice data according to the first embodiment of the present invention.

FIG. 5 is a flow chart showing a procedure for receiving the extended call-in control signal 113 in the mobile station 3b and reproducing the voice data.

In a step ST21, the extended call-in control signal 113 is received in the main control unit 15 of the mobile station 3b through the receiving unit 13.

In a step ST22, the main control unit 15 judges according to an identification signal included in the extended call-in control signal 113 whether or not the extended call-in control signal 113 is a signal for the user of the mobile station 3b. The identification signal is, for example, an international mobile subscriber identity (IMSI) in the GSM recommendations. In cases where the extended call-in control signal 113 is not a signal for the user of the mobile station 3b, the procedure returns to the step ST21.

In contrast, the main control unit 15 acknowledges in the step ST22 that the extended call-in control signal 113 is a signal for the user of the mobile station 3b, the main control unit 15 acknowledges in a step ST23 whether or not voice data is added to the extended call-in control signal 113. In cases where voice data is not added to the extended call-in control signal 113, the procedure is completed. In contrast, in cases where voice data is added to the extended call-in control signal 113, a call-in sound is rung in the speaker 22 for a prescribed time under control of the main control unit 15, and the added voice data, which is, for example, a user's name, a name of a company, to which the user belongs, or information indicating a degree of call importance specified on the call-out side, is reproduced in the main control unit 15.

Thereafter, the user of the mobile station 3b judges according to the reproduced voice data whether or not he performs an answer to the call for a telephone conversation.

As is described above, in the first embodiment, the user of the call-in side can reliably recognize the caller or can recognize a degree of importance of the call according to the voice before an answer to the call. Also, the caller can give an impression and/or an advertisement to the user of the call-in side by transmitting a person name or a company name registered in the network managing apparatus 4.

In addition, it is not required to store voice data in the mobile station 3a.

Embodiment 2

The configuration of a portable telephone communication system according to a second embodiment is the same as that shown in FIG. 2 according to the first embodiment. In the first embodiment, voice data added to the extended call-in control signal 113 is necessarily reproduced. However, in the second embodiment, a user of the mobile station 3b of the call-in side can sets whether or not added voice data should be reproduced.

Next, an operation is described.

Figure 6:
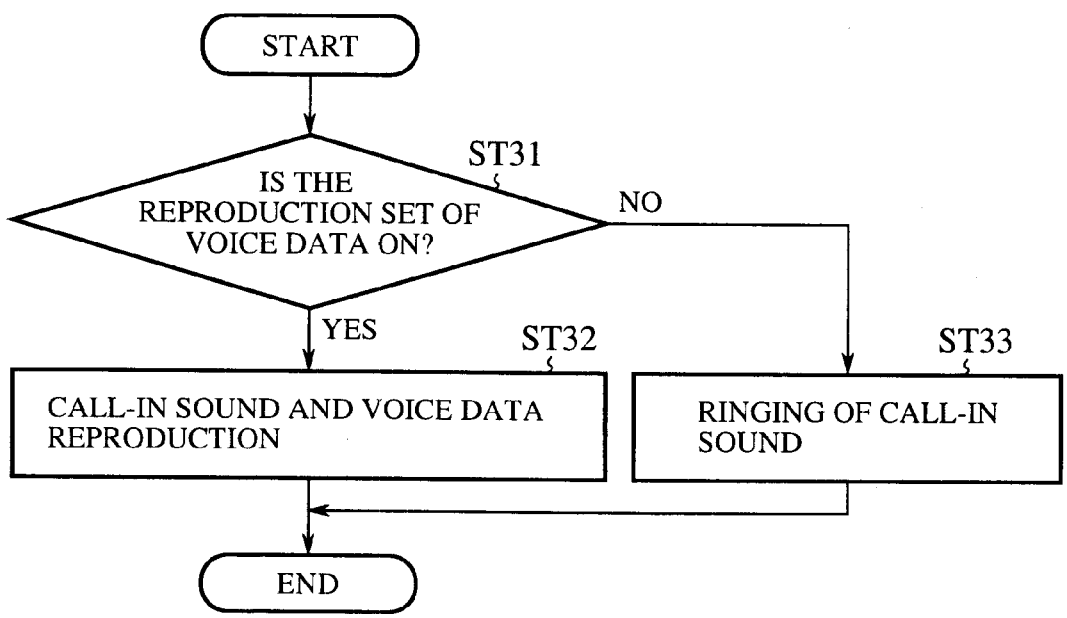
FIG. 6 is a flow chart showing a procedure for the reproduction and control of voice data according to a second embodiment of the present invention.

FIG. 6 is a flow chart showing a procedure for the reproduction and control of voice data according to the second embodiment of the present invention. It is sets according to a key operation of a user of the mobile station 3b whether or not -transmitted voice data is to be reproduced after a call-in sound rung in response to the reception of the transmitted voice data, and a reproduction set ON (denoting reproduction permission) or a reproduction set OFF (denoting reproduction prohibition) is stored in the internal memory 18 in response to the key operation of the user under control of the main control unit 15. In a step ST31, the main control unit 15 of the mobile station 3b, in which an extended call-in control signal 113 is received, acknowledges through the memory control unit 19 whether or not a reproduction set of voice data is set to ON in the internal memory 18.

In cases where a reproduction set of voice data is set to ON in the step ST31, in a step ST32, a call-in sound is rung under control of the main control unit 15, and the voice data is reproduced. In contrast, in cases where a reproduction set of voice data is set to OFF in the step ST31, a call-in sound is only rung under control of the main control unit 15 in a step ST33.

As is described above, in the second embodiment, the user of the mobile station 3b of the call-in side can select the reproduction of the transmitted voice data or the non-reproduction of the transmitted voice data according to conditions of the user.

Embodiment 3

The configuration of a portable telephone communication system according to a third embodiment is the same as that shown in FIG. 2 according to the first embodiment. In the first embodiment, voice data is added to the extended call-in control signal 113. However, in the third embodiment, arbitrary text data is added as additional information in place of the voice data.

Next, an operation is described.

Figure 7:
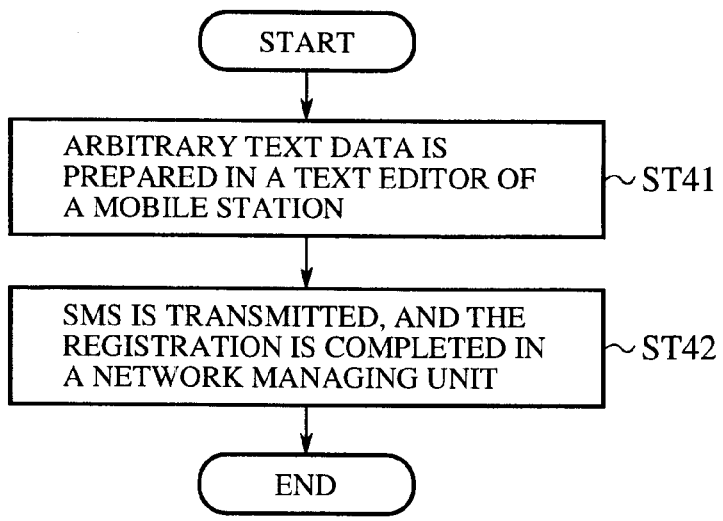
FIG. 7 is a flow chart showing a procedure for registering text data according to a third embodiment of the present invention.

FIG. 7 is a flow chart showing a procedure for registering text data according to a third embodiment of the present invention. Here, because the correspondence between a user's key operation and a function obtained by the key operation can be arbitrarily prescribed, the description of the user's key operation is omitted.

In a step ST41, text data desired to be added is prepared in the main control unit 15 of the mobile station 3a by using a text editor (not shown) of the mobile station 3a. The text data is, for example, a company name, an attention calling sentence such as "urgent" or a title of contents of a telephone conversation to be performed hereafter.

In a step ST42, the text data is transmitted from the mobile station 3a to the network managing apparatus 4 as a registration signal 112 under control of the main control unit 15 of the mobile station 3a, for example, at a dial number pre-set in the network managing apparatus 4 according to a short message service (SMS) of the GSM, and the text data is registered in the additional information storing unit 32 under control of the network control unit 31 of the network managing apparatus 4. Here, the SMS is used. However, it is applicable that the text data be sent in the same manner as in a pocket bell and be registered by a ten key input in a conversation mode.

Thereafter, in cases where the user of the mobile station 3a, who has registered the text data, gives a phone call to a user of the mobile station 3b, an extended call-in control signal 113, to which the text data registered in the additional information storing unit 32 is added, is transmitted from the network managing apparatus 4 to the mobile station 3b under control of the network control unit 31 of the network managing apparatus 4.

In contrast, in cases where the user of the mobile station 3a gives a phone call to a user of the mobile station 3b without adding the registered text data to an extended call-in control signal 133, specification information indicating the non-addition of registered text data is set in a call-out control signal 111 and is transmitted to the network managing apparatus 4. Thereafter, a call-in control signal, to which no text data is added, is transmitted from the network managing apparatus 4 to the mobile station 3b.

Figure 8:
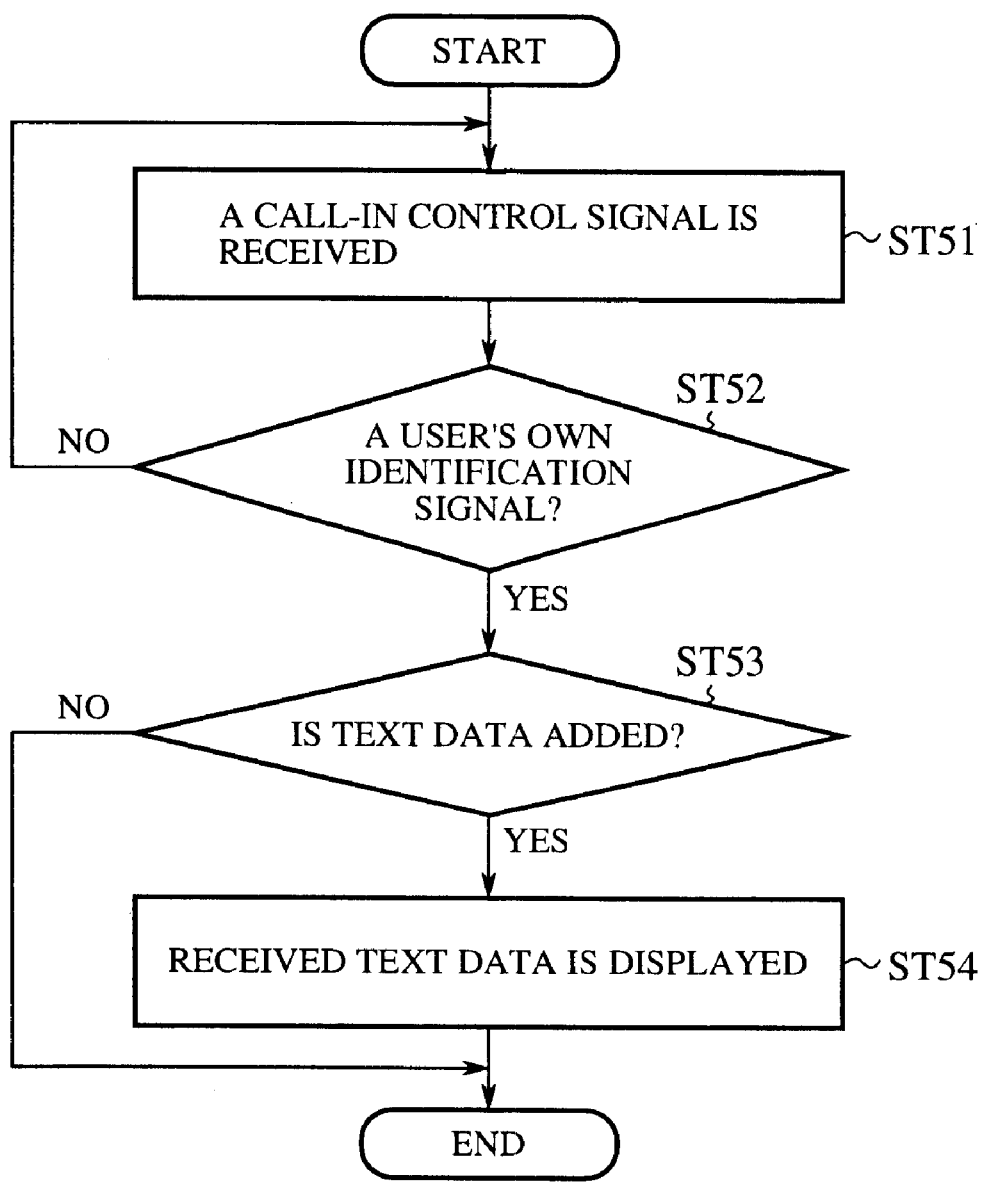
FIG. 8 is a flow chart showing a procedure for displaying the text data According to the third embodiment of the present invention.

FIG. 8 is a flow chart showing a procedure for displaying the text data according to the third embodiment of the present invention.

In a step ST51, the extended call-in control signal 113 is received in the main control unit 15 of the mobile station 3b of the call-in side. In a step ST52, the main control unit 15 judges according to an identification signal included in the extended call-in control signal 113 whether or not the extended call-in control signal 113 is a signal for the user of the mobile station 3b. The identification signal is, for example, the IMSI in the GSM. In cases where the extended call-in control signal 113 is not a signal for the user of the mobile station 3b, the procedure returns to the step ST51.

In contrast, the main control unit 15 acknowledges in the step ST52 that the extended call-in control signal 113 is a signal for the user of the mobile station 3b, the main control unit 15 acknowledges in a step ST53 whether or not text data is added to the extended call-in control signal 113. In cases where no text data is added to the extended call-in control signal 113, the procedure is completed. In contrast, in cases where text data is added to the extended call-in control signal 113, the text data, which is, for example, a company name or an attention calling sentence, is displayed on the displaying unit 16 under control of the main control unit 15.

Thereafter, the user of the mobile station 3b judges according to the displayed text data whether or not the user of the mobile station 3b performs an answer to the call to start a telephone conversation.

As is described above, in the third embodiment, the user of the call-in side can reliably recognize the caller or can recognize a matter of the call or a degree of importance of the call according to the text data before an answer to the call. Also, the caller can give an impression and/or an advertisement to the user of the call-in side by transmitting a person name or a company name registered in the network managing apparatus 4.

In addition, it is not required to store the text data in the mobile station 3a.

Embodiment 4

The configuration of a portable telephone communication system according to a fourth embodiment is the same as that shown in FIG. 2 according to the first embodiment. In the fourth embodiment, a plurality of prescribed types of text data are prepared in advance and registered in the network managing apparatus 4.

A plurality of types of registered text data, which are, for example, attention calling sentences such as "urgent", "definitely bring profit" and the like, and identification numbers corresponding to the types of registered text data are initially transmitted from the network managing apparatus 4 to the mobile station 3a, for example, according to the short message service (SMS) of the GSM.

In this embodiment, the SMS is used. However, it is applicable that information of a plurality of types of text data written in a paper be held in the mobile station 3a in advance.

Thereafter, in cases where a user of the mobile station 3a gives a phone call to a user of the mobile station 3b, an identification number corresponding to a desired type of text data is added to a call-out control signal 111 in the mobile station 3a, and the call-out control signal 111 is transmitted to the network managing apparatus 4 through the radio base station 1a. In the network managing apparatus 4, the desired type of text data corresponding to the transmitted identification number is added to a call-in control signal to obtain an extended call-in control signal 113, and the extended call-in control signal 113 is transmitted to the mobile station 3b of the call-in side.

As is described above, in the fourth embodiment, a type of text data to be added can be appropriately selected in the mobile station 3a of the call-out side in correspondence to each call to be given to the mobile station 3b of the call-in side.

Also, it is not required to store the plurality of types of text data in the mobile station 3a.

As is described above, the portable telephone communication system and the portable telephone communication method according to the present invention are appropriate to specify a caller and to judge a degree of importance of a call.

What is claimed is:

1. A portable telephone communication system, comprising:

a plurality of mobile stations existing in a control zone which denotes a service area;

a radio base station for communicating with the mobile stations; and a network managing apparatus for managing a network of the control zone, wherein the network managing apparatus registers, according to a request of a first mobile station of the mobile stations, additional information to be added to a call-in control signal which is to be transmitted to a second mobile station of the mobile stations, the network managing apparatus receives a call-out control signal transmitted from the first mobile station through the radio base station, the network managing apparatus adds the registered additional information to the call-in control signal which is to be transmitted to the second mobile station, the network managing apparatus transmits the call-in control signal to the second mobile station, and the second mobile station outputs the additional information, which is added to the call-in control signal, before an answer to a call of the first mobile station.

2. A portable telephone communication system according to claim 1, wherein the additional information registered in the network managing apparatus is information specifying a user of the first mobile station.

3. A portable telephone communication system according to claim 1, wherein the additional information registered in the network managing apparatus is information indicating a degree of importance of the call of the first mobile station.

4. A portable telephone communication system according to claim 1, wherein the network managing apparatus registers voice data as the additional information.

5. A portable telephone communication system according to claim 1 wherein the network managing apparatus registers. text data as the additional information.

6. A portable telephone communication system according to claim 5, wherein the first mobile station transmits the text data according to a short message service (SMS) of a Global System for Mobile Communications (GSM) to register the text data in the network managing apparatus.

7. A portable telephone communication system according to claim 1, wherein the second mobile station sets whether or not the additional information added to the call-in control signal is to be output, the second mobile station rings a call-in sound and outputs the additional information when the call-in control signal, to which the additional information is added, is received in the second mobile station in cases where the second mobile station sets so as to output the additional information.

8. A portable telephone communication system according to claim 1, wherein the network managing apparatus comprises:

an additional information storing unit for registering the additional information; and a network control unit for adding the additional information registered in the additional information storing unit to the call-in control signal to be transmitted to the second mobile station.

9. A portable telephone communication system, comprising:

a plurality of mobile stations existing in a control zone which denotes a service area;

a radio base station for communicating with the mobile stations; and a network managing apparatus for managing a network of the control zone, wherein the network managing apparatus registers a plurality of types of additional information respectively to be added to the call-in control signal, which is to be transmitted to the second mobile station, and a plurality of numbers corresponding to the plurality of types of additional information, the plurality of types of additional information and the corresponding numbers are transmitted to the first mobile station, the first mobile station selects a prescribed type of additional information from the plurality of types of transmitted additional information, the first mobile station adds a number corresponding to the prescribed type of additional information to the call-out control information, the first mobile station transmits the call-out control information to the network managing apparatus through the radio base station, the network managing apparatus adds the prescribed type of registered additional information corresponding to the number, which is added to the call-out control information, to the call-in control signal to be transmitted to the second mobile station, the network managing apparatus transmits the call-in control signal to the second mobile station through the radio base station, and the second mobile station outputs the additional information, which is added to the call-in control signal, before an answer to a call of the first mobile station.

10. A portable telephone communication method, in which a communication is performed while having a plurality of mobile stations existing in a control zone which denotes a service area, a radio base station for communicating with the mobile stations, and a network managing apparatus for managing a network of the control zone, comprising the steps of:

registering additional information to be added to a call-in control signal according to a request of a first mobile station of the mobile stations in the network managing apparatus, the call-in control signal being transmitted to a second mobile station of the mobile stations;

receiving a call-out control signal, which is transmitted from the first mobile station through the radio base station, in the network managing apparatus;

adding the registered additional information to the call-in control signal, which is to be transmitted to the second mobile station, in the network managing apparatus;

transmitting the call-in control signal from the network managing apparatus to the second mobile station; and outputting the additional information, which is added to the call-in control signal, from the second mobile station before an answer to a call of the first mobile station.

* * * * *

UNITED STATES PATENT AND TRADEMARK OFFICE
CERTIFICATE OF CORRECTION

PATENT NO.    : 6,477,365 B2
DATED         : November 5, 2002
INVENTOR(S)   : Fumiyo Fukuda It is certified that error appears in the above-identified patent and that said Letters Patent is hereby corrected as shown below:

Column 4,
Line 66, "According" should be -- according --.

Column 5,
Line 21, "FIG. 2?," should be -- FIG. 2, --.

Signed and Sealed this

Twenty-fifth Day of February, 2003

JAMES E. ROGAN
*Director of the United States Patent and Trademark Office*